United States Patent
Williams et al.

(10) Patent No.: US 9,541,966 B2
(45) Date of Patent: Jan. 10, 2017

(54) SYSTEMS AND METHODS FOR UTILIZING ACCELERATION EVENT SIGNATURES

(75) Inventors: Rodney Owen Williams, Cary, NC (US); Gregory A. Dunko, Cary, NC (US)

(73) Assignee: HTC CORPORATION, Taoyuan (TW)

( * ) Notice: Subject to any disclaimer, the term of this patent is extended or adjusted under 35 U.S.C. 154(b) by 795 days.

(21) Appl. No.: 13/226,930

(22) Filed: Sep. 7, 2011

(65) Prior Publication Data

US 2013/0060513 A1     Mar. 7, 2013

(51) Int. Cl.
  G06F 15/00   (2006.01)
  G06F 1/16    (2006.01)
  H04M 1/725   (2006.01)
  H04M 1/23    (2006.01)

(52) U.S. Cl.
  CPC ........ G06F 1/1694 (2013.01); H04M 1/72522 (2013.01); H04M 1/236 (2013.01); H04M 2250/12 (2013.01)

(58) Field of Classification Search
  CPC .. G06F 1/1694; H04M 1/236; H04M 1/72522; H04M 2250/12
  USPC .................................................. 345/156–179
  See application file for complete search history.

(56) References Cited

U.S. PATENT DOCUMENTS

| | | | | |
|---|---|---|---|---|
| 2006/0211499 A1* | 9/2006 | Bengtsson | ............ | G06F 1/1626 463/47 |
| 2007/0132740 A1* | 6/2007 | Meiby | ..................... | G06F 3/016 345/173 |
| 2008/0219521 A1* | 9/2008 | Benkley | .............. | G06K 9/00026 382/124 |
| 2009/0270141 A1* | 10/2009 | Sassi | .................... | G06F 3/03547 455/575.1 |
| 2011/0054831 A1* | 3/2011 | Fujiwara | ................. | G06F 3/017 702/141 |
| 2011/0080349 A1* | 4/2011 | Holbein | ................ | G06F 1/3203 345/173 |
| 2015/0112633 A1* | 4/2015 | Lee | ......................... | G01P 1/127 702/141 |

FOREIGN PATENT DOCUMENTS

TW     201126374 A     8/2011

OTHER PUBLICATIONS

Office Action received in corresponding Taiwan application (Nov. 21, 2014).
Office Action received in corresponding China application (Mar. 4, 2015).

* cited by examiner

*Primary Examiner* — Amare Mengistu
*Assistant Examiner* — Jennifer Zubajlo
(74) *Attorney, Agent, or Firm* — McClure, Qualey & Rodack, LLP

(57) ABSTRACT

Systems and methods are described for utilizing acceleration event signatures. One method for utilizing acceleration event signatures in an electronic device comprises receiving, by the electronic device, one or more acceleration events. The method further comprises determining whether the received one or more acceleration events correspond to one or more predefined signature definitions and invoking one or more functions based on the one or more acceleration events.

20 Claims, 8 Drawing Sheets

SYSTEMS AND METHODS FOR UTILIZING ACCELERATION EVENT SIGNATURES

BACKGROUND

Over the years, mobile devices such as smartphones have become widespread. With the rapid development in communication technology, smartphones have become an integral part of many people's lives given the portability, the convenient access to the Internet, and the growing number of applications available on smartphones. Today, individuals can perform a wide range of functions such as shopping, social networking, etc. via mobile devices. To operate such devices, physical hardware keys are commonly used to control such functions as audio volume control, display sleep/wake control, ringer-off mode, and so on. However, physical hardware keys and the surrounding circuitry can weaken in mechanical tactility or electrical conductivity over time, thereby causing performance degradation.

In addition, physical keys may make it more difficult to seal or water-proof a device. Thus, electromechanical functions can present reliability concerns. Furthermore, the location of physical hardware keys may act as a point of entry for electrostatic discharge, which can damage mobile devices. Finally, physical hardware keys and the surrounding circuitry often use a significant portion of the highly sought-after circuitry real estate around the edge of a circuit board or device where antennas, acoustic orifices, and/or connectors compete for access to external interfaces. The industrial design of a product must also accommodate provisions for the key buttons, which may affect the overall design theme.

SUMMARY

Briefly described, one embodiment, among others, is a method for utilizing acceleration event signatures in an electronic device comprises receiving, by the electronic device, one or more acceleration events. The method further comprises determining whether the received one or more acceleration events correspond to one or more predefined signature definitions and invoking one or more functions based on the one or more acceleration events.

Another embodiment is an electronic device for utilizing acceleration event signatures comprising an accelerometer configured to receive an acceleration event, a filter configured to filter the acceleration event based on characteristics associated with the acceleration event, and a signature correlator configured to determine whether the received acceleration event corresponds to a predefined acceleration event signature. The electronic device further comprises a memory configured to store one or more predefined signature definitions and a function controller configured to invoke a function based on the received acceleration event.

Another embodiment is a non-transitory computer-readable medium embodying a program executable in an electronic device, the program comprising logic for receiving as an input one or more acceleration events generated by a user or an accessory based on contact with the electronic device, logic for determining whether the received one or more acceleration events correspond to one or more predefined signature definitions, and logic for invoking one or more functions based on the acceleration events.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
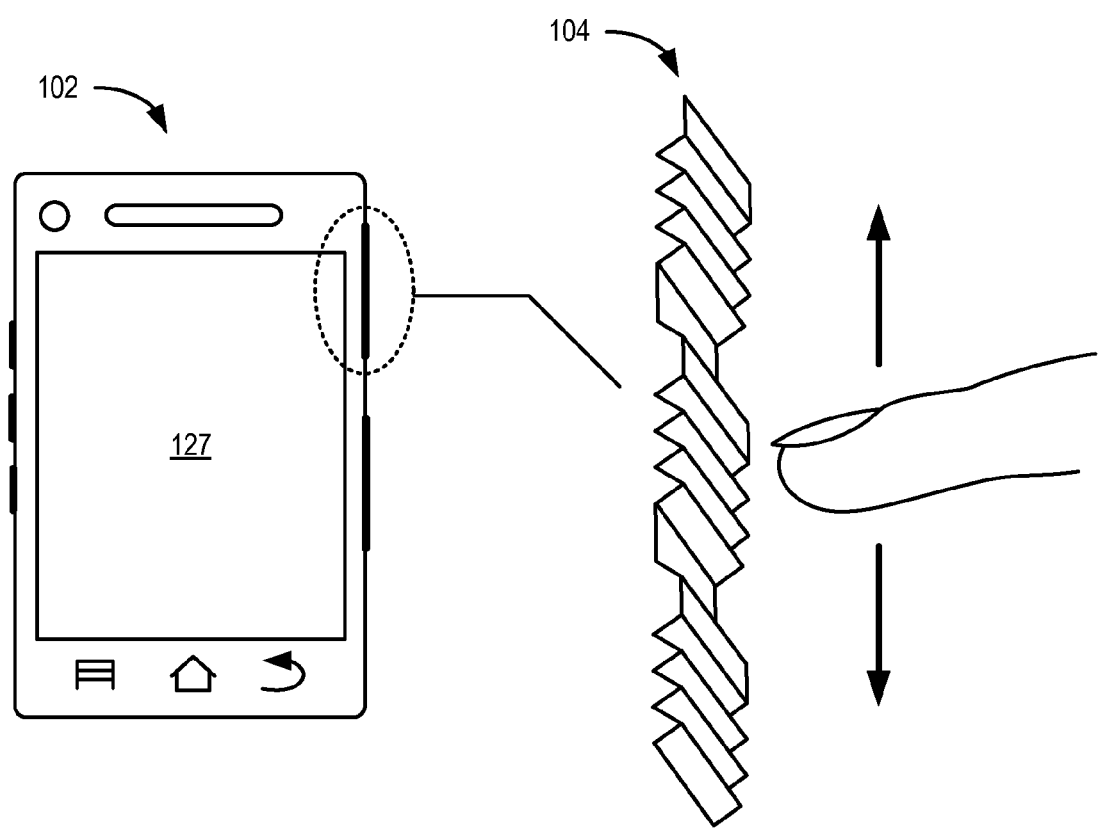
FIG. 1 depicts a mobile device with a ridged member.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As described earlier, physical hardware keys are commonly used to operate mobile devices and to invoke such functions as audio volume control, display sleep/wake control, and so on. However, physical hardware keys and the surrounding circuitry can weaken in mechanical tactility or electrical conductivity over time and can thus present reliability issues. Furthermore, the location of physical hardware keys may act as a point of entry for electrostatic discharge, which can damage the mobile device. Physical hardware keys and the surrounding circuitry often use a significant portion of the highly sought-after circuitry real estate around the edge of a circuit board or device where antennas, acoustic orifices, and/or connectors compete for access to external interfaces. The industrial design of a product must also accommodate provisions for the key buttons, which may affect the overall design theme. A reliable means for decoupling physical keys from direct electromechanical connection is therefore desirable.

Various embodiments are described for utilizing acceleration event signatures to invoke various functions on an electronic device such as a mobile device, tablet, and so on. Systems and methods for detecting acceleration events are described in addition to systems and methods for defining acceleration event signatures. For purposes of this disclosure, acceleration events may refer to such events as vibrations experienced by the electronic device. Note, however, that acceleration events may also refer to other events such as change in velocity, a free fall state, mechanical shock, and so on. The detection bandwidth of accelerometers for systems described herein is generally on the order of hundreds of Hertz but is not limited to this range. For various embodiments, a clock source is utilized to capture acceleration events as such events are time dependent. Accuracy of the clock frequency is generally not critical as the event frequency can vary widely depending on the user's vigor at generating the event sequence. Some implementations utilize a low power clock on the product which can be shared for the purpose of acceleration event detection. The clock provides a timing reference for measuring frequency of received acceleration events.

For event detection methods, there are generally two cases that can impact the overall power consumption and battery life of the mobile device to a greater or lesser extent. The first case is when the product is programmed to be in a deep sleep mode. In deep sleep mode, it is typical that certain interrupt events will wake the device to transition into a higher operational level. In general, mobile consumer electronics products are not designed to wake up a controlling CPU based on the occurrence of an acceleration event since simply moving the device (which could comprise, for example, picking up the device from a table, thereby resulting in an acceleration event being generated), and hence causing an acceleration event to be processed and discarded as inconsequential would drain the battery. Various embodiments therefore implement filtering acceleration events to remove or reduce false detections. The accelerometer device utilized in various embodiments has additional capabilities than simply decoding single and double tap events. The second case, where power consumption and battery life are affected to a lesser extent, occurs when the electronic device is at a higher level of functionality, where detection of the event sequence is less dependent on the decoding capability of the accelerometer device. In this case, the acceleration sequence data can be sent in raw or unfiltered form to the host central processing unit (CPU) for detection. It is during this second case where higher detection performance and higher complexity signatures can be utilized.

Another aspect of various embodiments relates to defining acceleration event signatures, which comprises one or more acceleration events. In accordance with exemplary embodiments, one or more ridged members are implemented on the external surface of the device. Reference is made to FIG. 1, which depicts a mobile device 102 with a ridged member 104. Note that while various embodiments are described in the context of a mobile device, the techniques described herein may be applied to electronic devices in general.

While users typically use a touchscreen display 127 such as the one shown to operate the mobile device 102, the ridged member 104 provides the user with an alternative means for operating the mobile device 102. As shown, a user may swipe a finger, fingernail, or other object across the ridged member to generate acceleration events. The acceleration event generated by physical user input is transmitted to an accelerometer (not shown). For exemplary embodiments, the accelerometer is located near the ridged member 104 and mechanically coupled to allow suitable transmission of the acceleration input to the accelerometer. By utilizing target criteria as described in detail below, acceleration events for invoking functions are distinguished from other acceleration noise inputs.

Figure 2:
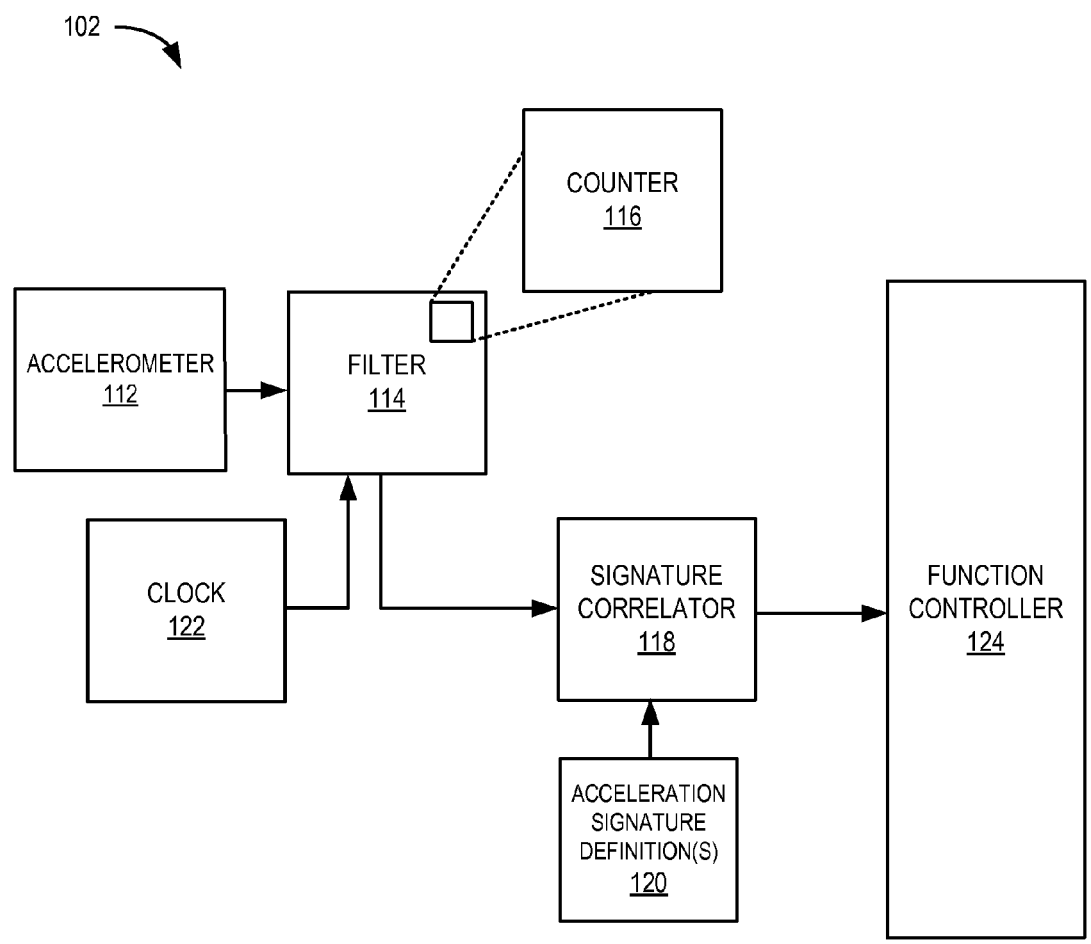
FIG. 2 is a block diagram showing various components of the mobile device in FIG. 1.

Reference is made to FIG. 2, which is a block diagram showing various components of the mobile device 102 in FIG. 1. In accordance with various embodiments, the mobile device 102 includes an accelerometer 112, which detects such inputs as vibrations, taps, and so on. The input received by the accelerometer 112 is forwarded to a filter 114, which is configured to filter acceleration events that do not match a target criteria so that false detections are avoided. For example, the filter 114 may be configured to filter events by comparing an elapsed time between successive acceleration events with a predetermined threshold. For example, if the elapsed time exceeds the predetermined threshold, then the events are disregarded. The filter 114 may be configured to determine whether a predetermined number of acceleration events is received within a window of time such that the events are disregarded if the predetermined number is not met or exceeded. For example, the filter 114 may be configured to require at least two acceleration events to occur within a window of 2 seconds in order to further process the received acceleration events. The filter 114 may also be configured to only further process acceleration events with corresponding frequencies that fall within a target frequency band.

When the user swipes his finger across the ridges in the ridged member 104 (FIG. 1), a vibration with a corresponding frequency, frequency signature, or frequency pattern is generated. The filter 114 analyzes this frequency to determine whether it falls within the target frequency band of interest. In general, the filter 114 is configured to filter events not meant to invoke functions on the mobile device 102 caused by physical contact from simply handling the mobile device 102. As timing is involved, the filter 114 may be coupled to a clock 122, which provides a reference clock for determining the timing and frequency associated with received acceleration events. The filter 114 further comprises a counter 116 for tracking the number of acceleration events received within a window of time. If acceleration events are disregarded (i.e., determined to be false detections), then the counter 116 may be reset for the next sequence of acceleration events.

The mobile device 102 further comprises a signature correlator 118 configured to determine whether a received acceleration event corresponds to a predefined acceleration event signature, where the signature correlator 118 is configured to filter the received acceleration event if the received acceleration event does not correspond to a predefined acceleration event signature. The signature correlator 118 retrieves one or more acceleration signature definitions 120 stored in a memory device on the mobile device 102. If a match is not found by the signature correlator 118 between the received acceleration event and the stored signature definition, then the received acceleration event is disregarded. Note that while the acceleration signature definitions 120 may be stored locally on the mobile device 102, the acceleration signature definitions 120 may also be stored remotely at, for example, a central server (not shown). In such implementations, the signature correlator 118 communicates with the server to retrieve acceleration signature definitions 120.

Figure 3A:
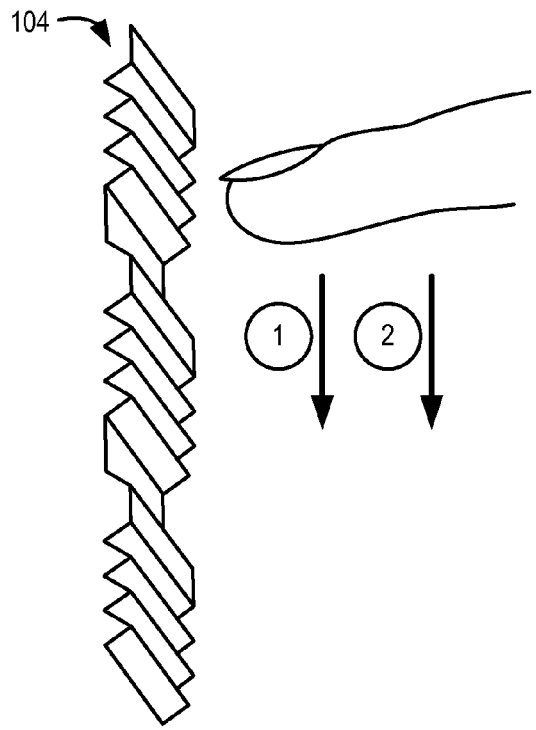
FIGS. 3A-D illustrate just some of many possible acceleration signatures that may be defined.
Figure 3B:
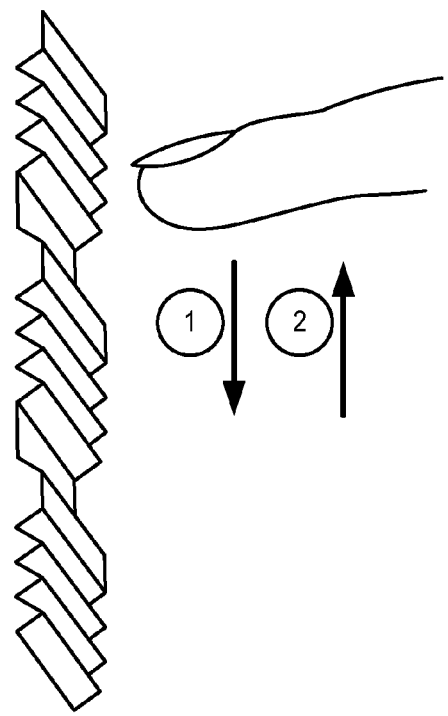
Figure 3C:
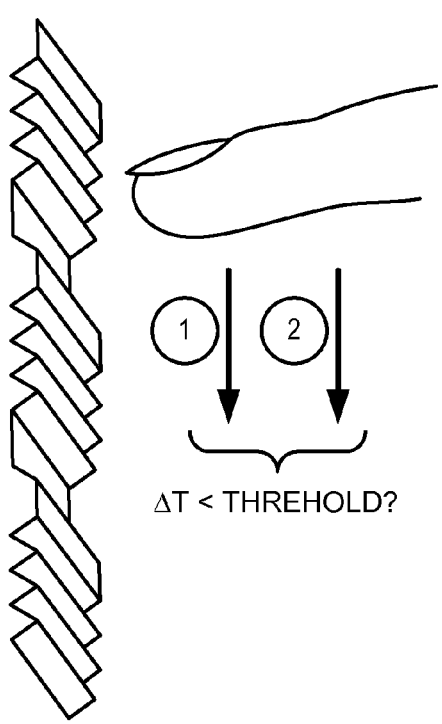

To further illustrate the concept of acceleration signature definitions, reference is made to FIGS. 3A-D. Shown are just some of many possible acceleration signatures that may be defined. In the example shown in FIG. 3A, one predefined acceleration signature may comprise two swipes in the same direction across the ridged member 104. FIG. 3B shows another example where a bi-directional swipe is used. As described earlier in connection with FIG. 2, the filter 114 may be configured to determine whether successive swipes fall within a predetermined threshold. As shown in FIG. 3C, if the successive swipes are not received within a time (ΔT) of each other, the filter 114 disregards the acceleration events. In this regard, the filter 141 may be configured to perform filtering of acceleration events that comprises comparing an elapsed time between successive acceleration events with a predetermined threshold.

Figure 3D:
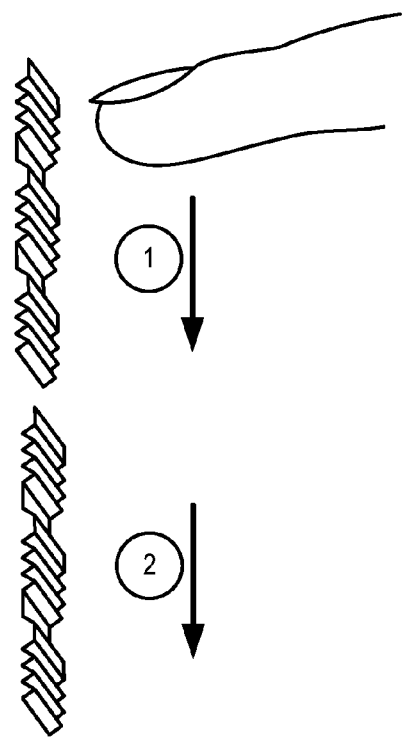

The filtering of acceleration events may also comprise determining whether a predetermined number of acceleration events is received within a predetermined amount of time. Filtering acceleration events may also comprise filtering acceleration events with frequencies outside a target frequency band. For some embodiments, filtering of acceleration events may comprise filtering acceleration events that do not match a predefined signature definition stored on the electronic device. FIG. 3D illustrates an example where two separate ridged members are used where the user swipes across to the two ridged members to invoke a certain command.

By simply swiping a finger across the ridged member 104, the user generates acceleration events that the accelerometer 112 in FIG. 2 detects. Based on the spacing between peaks in the ridged member 104, vibrations of a certain frequency (or frequencies) are created. Thus, the spacing between peaks in the ridged member 104 can be set to generate a target frequency that corresponds to one or more functions to be invoked on the mobile device 102.

Figure 4A:
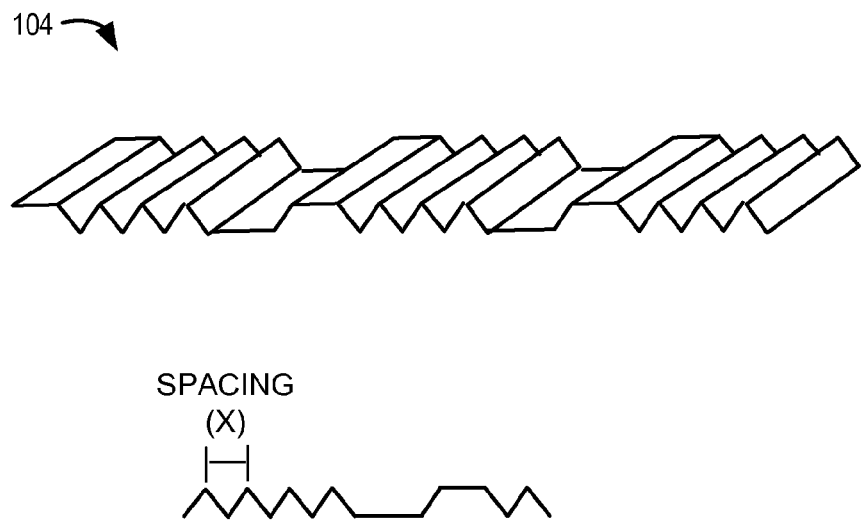
FIGS. 4A-B illustrate embodiments of the ridged member.

To illustrate, reference is made to FIG. 4A, which illustrates the spacing between peaks in a ridged member 104. Consider the following example dimensions relating to the spacing between the peaks on the ridged member 104. For one embodiment, the sequence of ridges is partitioned such that a portion of the ridged member 104, perhaps 4 mm in length, contains peaks spaced 100 microns apart and a number of repeated portions, perhaps 6.4 mm in length, each containing peaks spaced by specifically varying distances and a final portion similar to the first that ends the sequence. Note that these dimensions are provided only for purposes of illustration, and other dimensions may be utilized for the ridged member 104. Swiping across these portions results in different frequency patterns being generated, such that the starting and finishing velocity of the swipe can be estimated. A predefined acceleration signature may comprise a predetermined number of swipes where the first swipe allows the direction of swipe to be determined and where successive swipes improve likelihood of proper detection.

Figure 4B:
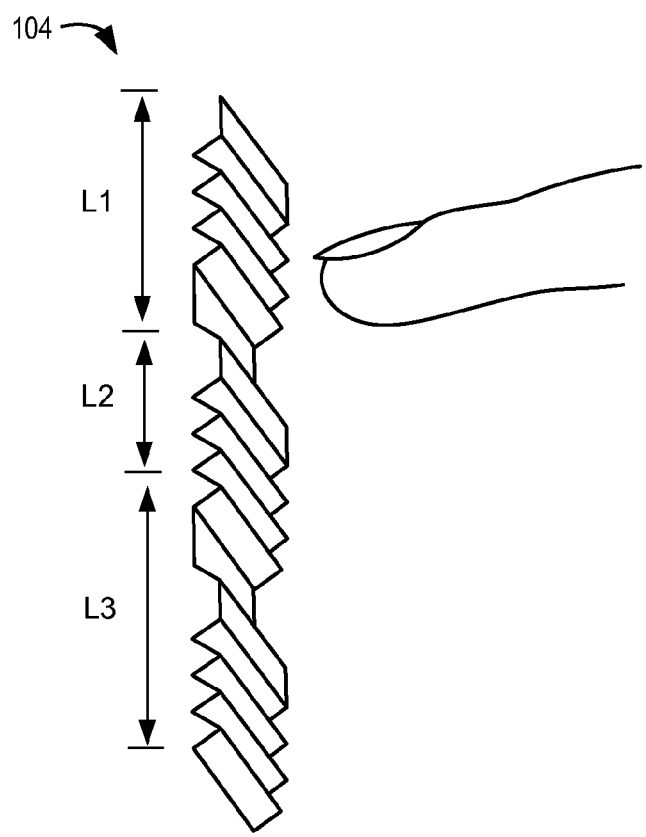

In accordance with another embodiment, a given ridged member 104 may be partitioned, as described above, where each partition of the ridge may correspond to a portion of a pattern. Shown in FIG. 4B is an example of a ridged member 104 partitioned according to various lengths. The first sequence of ridges in the first partition has a length (L1) and may correspond, for example, to a known high frequency and low frequency pattern where the first partition is used to determine a velocity of a swipe. The second partition has length (L2) and may be used, for example, to determine the direction of the swipe. The third partition may be used, for example, to monitor for a second instance of the pattern to improve likelihood of proper detection. For the example in FIG. 4B, all three partitions may be used to monitor various attributes (e.g., velocity, direction) relating to a pre-defined acceleration signature. Note that implementing partitions within the ridged member 104 relating to various attributes is yet another means for providing a robust design for detecting more complex acceleration signatures that have high likelihood of positive detection.

For some embodiments, a ridged member 104 with a length of 27.2 mm with ridges between 100 and 400 microns in size may be implemented. Note, however, that other lengths may be implemented as well to allow for easy swiping using a thumbnail while holding the product with a single hand. The ridged member 104 may be molded or otherwise formed into a housing constructed of metal, plastic, or other suitable material. The mechanical design of the ridge features is optimized for durability, high transmission of acceleration, and (optionally) supports bidirectional swipes. As also shown in FIG. 4, different shapes may also be incorporated to affect the vibration frequency. For example, a pointed peak or a flat section may be implemented in the ridged member 104. Similarly, the ridge pattern may be symmetric (e.g., from top to bottom) or may incorporate increased spacing between ridges, thereby resulting in decreased or increased frequency as a thumbnail or other object is moved from one end to the other, depending upon the direction.

The ridged member 104 can easily replace a small number of external keys on a device by mapping swipe patterns to key functions. For instance, swiping upward could be mapped to a volume up key function, and swiping downward could be mapped to a volume down key function. Swiping upward and downward in series could be mapped to a third key such as a device sleep function. If, while in a deep sleep mode, the clock 122 (FIG. 2) is not continuously available, the clocking may be applied in a polling mode to regularly look for an acceleration event assigned to be mapped to a wake-up key function. For example, swiping the ridged member 104 upward and downward several times in a row over a period of 1 or 2 seconds could reasonably be expected to be detected if a polling period was established to occur over a similar period. In this regard, the acceleration event may correspond to such functions as a wake-up function and volume control. It is commonplace for a mobile phone to wake up at least that often to receive radio signals to check certain network conditions.

Referring back to the block diagram in FIG. 2, the mobile device 102 further comprises a function controller 124 configured to invoke a function if an acceleration event is detected. For some embodiments, an acceleration event is detected if a received acceleration event is not filtered by the filter and the signature correlator. Such functions may include, for example, volume control, a wake-up function, a vibrate/silent mode, and so on. Note that the filter 114 and the signature correlator 118 work in conjunction to more accurately detect acceleration signatures that are more complex in nature. This allows the mobile device 102 to filter false events caused, for example, by simply handling the mobile device 102 and rubbing the mobile device 102 against another object. Note that while the various components 112, 114, 116, 118, 120, 124 are shown are separate blocks, the components 112, 114, 116, 118, 120, 124 may also be combined. For example, the components 114, 116, 118, 120, 124 shown may be integrated into the accelerometer 112. Variations and modifications may be made to the embodiments described herein without departing substantially from the spirit and principles of the disclosure.

Figure 5:
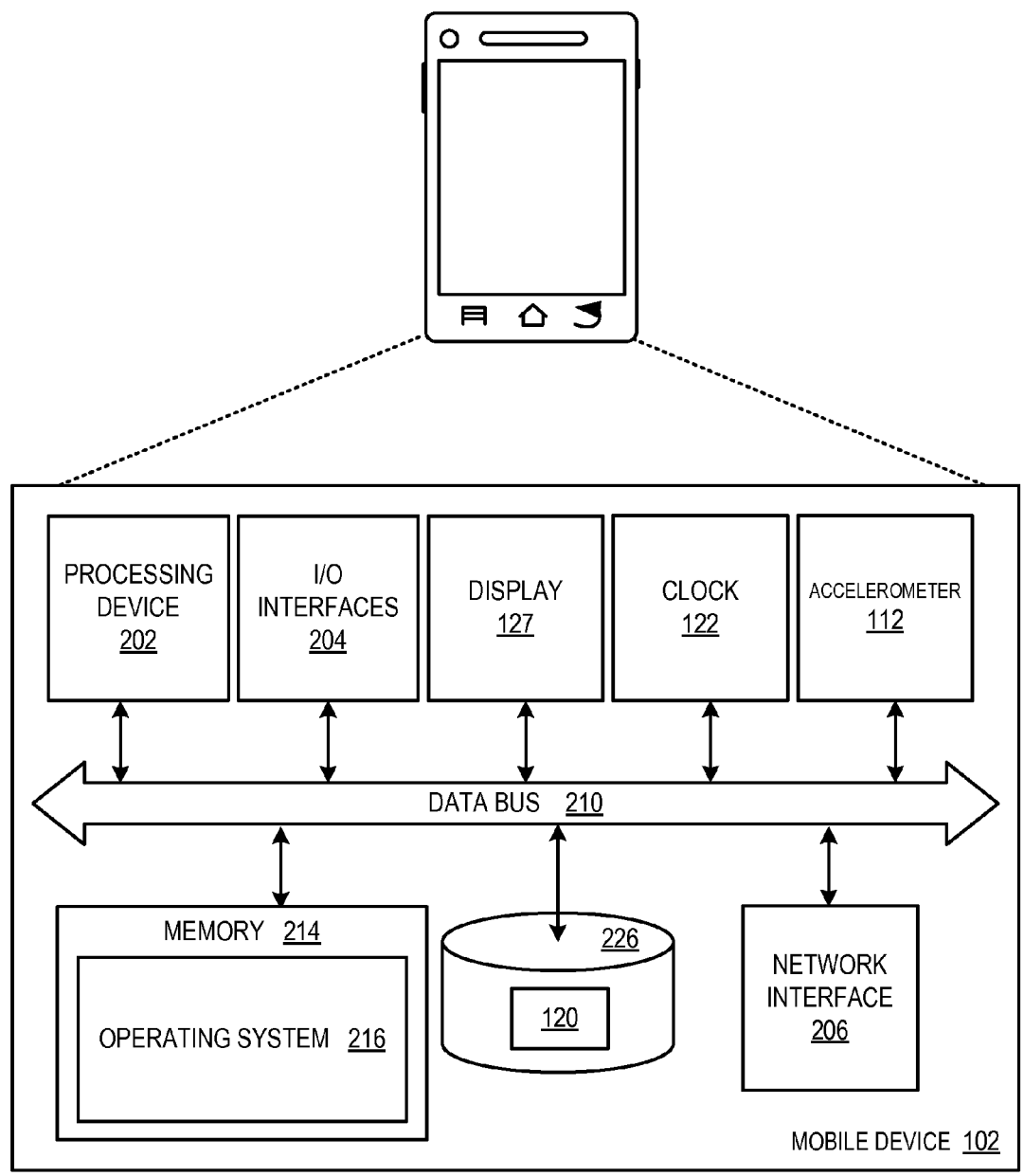
FIG. 5 illustrates an embodiment of the mobile device shown in FIG. 2.

Reference is made to FIG. 5, which illustrates an embodiment of the mobile device 102 shown in FIG. 2. As described earlier, the mobile device 102 may be embodied as a smartphone or other computing device, which may be embodied in any one of a wide variety of wired and/or wireless computing devices. As shown in FIG. 5, the mobile device 102 comprises memory 214, a processing device 202, a number of input/output interfaces 204, and a network interface 206, a clock 122, and an accelerometer 112. The mobile device 102 further comprises a display 127 and mass storage 226, wherein each of these devices are connected across a local data bus 210.

The processing device 202 may include any custom made or commercially available processor, a central processing unit (CPU) or an auxiliary processor among several processors associated with the mobile device 102, a semiconductor based microprocessor (in the form of a microchip), a macroprocessor, one or more application specific integrated circuits (ASICs), a plurality of suitably configured digital logic gates, and other well-known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements. The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the mobile device 102 depicted in FIG. 2.

In accordance with such embodiments, the components are stored in memory 214 and executed by the processing device 202. The acceleration signature definitions 120 shown in FIG. 2 may be stored in mass storage 226. One of ordinary skill in the art will appreciate that the memory 214 can, and typically will, comprise other components which have been omitted for purposes of brevity. Note that in the context of this disclosure, a non-transitory computer-readable medium stores programs for use by or in connection with an instruction execution system, apparatus, or device.

In this regard, one embodiment, among others, is a non-transitory computer-readable medium embodying a program executable in a computing device. For such embodiments, the program comprises logic for receiving as an input one or more acceleration events generated by a user or an accessory based on contact with the electronic device, logic for determining whether the received one or more acceleration events correspond to one or more predefined signature definitions. The program further comprises logic for invoking one or more functions based on the acceleration events. For some embodiments, the determining logic is further configured to filter acceleration events that do not correspond to a predefined acceleration event signature. For some embodiments, contact with the computing device comprises performing one or more swipes across a ridged member external to the electronic device, where the one or more swipes comprise bi-directional swipes made with respect to the ridged member.

Figure 6:
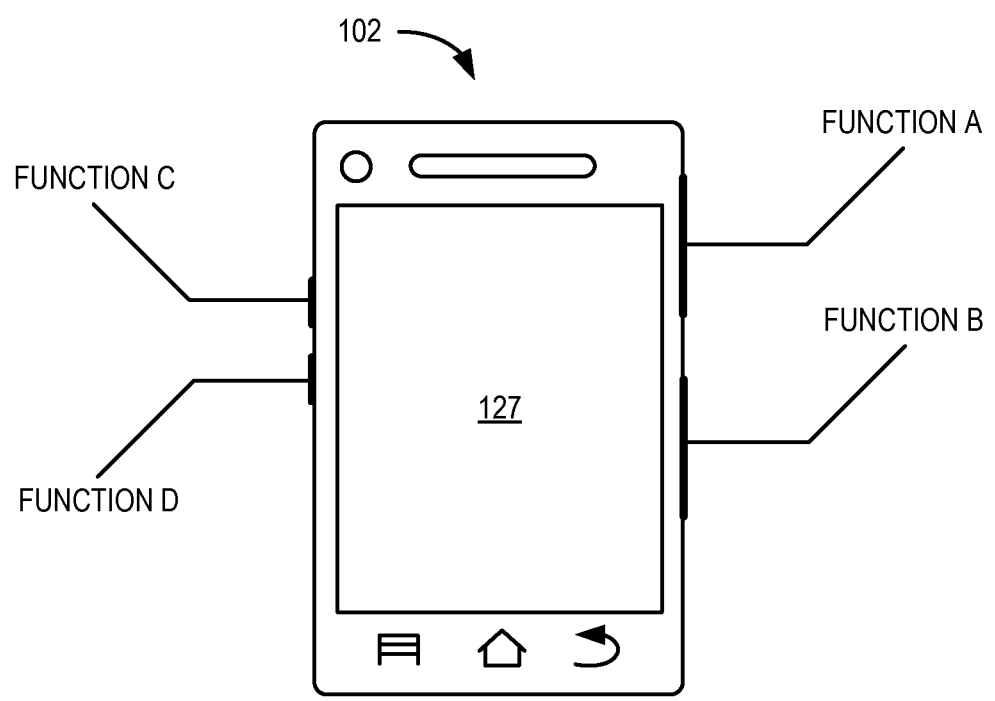
FIG. 6 illustrates the use of multiple ridged members on different locations of the mobile device, where the ridged members correspond to different functions.

FIG. 6 illustrates the use of multiple ridged members on different locations of the mobile device 102, where the ridged members correspond to different functions. As shown, multiple ridged members may be incorporated on different areas of the mobile device 102. Depending on which ridged member the user swipes, a particular function is invoked. To illustrate, upon swiping the ridged member shown on the upper right-hand side of the mobile device 102, Function A is invoked where Function A may comprise, for example, setting the mobile device 102 to a ringer-off mode or silent mode. Swiping the ridged member located in the middle section on the left side of the mobile device 102 invokes Function D, which may comprise, for example, adjusting the current volume level to a lower level. Note that while a one-to-one correspondence is shown in FIG. 6 where a single ridged member corresponds to a single function, a combination of different ridged members may be used for to input an acceleration event. Similarly, a single ridged member may be used to invoke multiple functions by changing the direction of the swipe, by entering multiple swipes, or by other means of varying the input. Note also that the ridged member in areas A through D may be different such that each corresponding ridge member generates a unique vibration frequency signature. In this regard, for some embodiments, the mobile device 102 may comprise a second ridged member configured to receive an acceleration event, wherein the function invoked is further based on a location of the ridged members on the electronic device.

For some embodiments, the mobile device 102 may comprise a second accelerometer configured to sense an acceleration event, wherein the function invoked is further based on a location of the accelerometers on the electronic device. For some embodiments, the mobile device 102 may include a plurality of ridged members, as shown in FIG. 6, where each ridged member is coupled to a respective accelerometer (rather than multiple ridged members being coupled to a single accelerometer). By having dedicated accelerometers for each ridged member, this helps to ensure that vibrations generated via the ridged members are not too attenuated due to the accelerometer not being proximate to the ridged member. This ultimately leads to more accurate detections of acceleration events.

Figure 7:
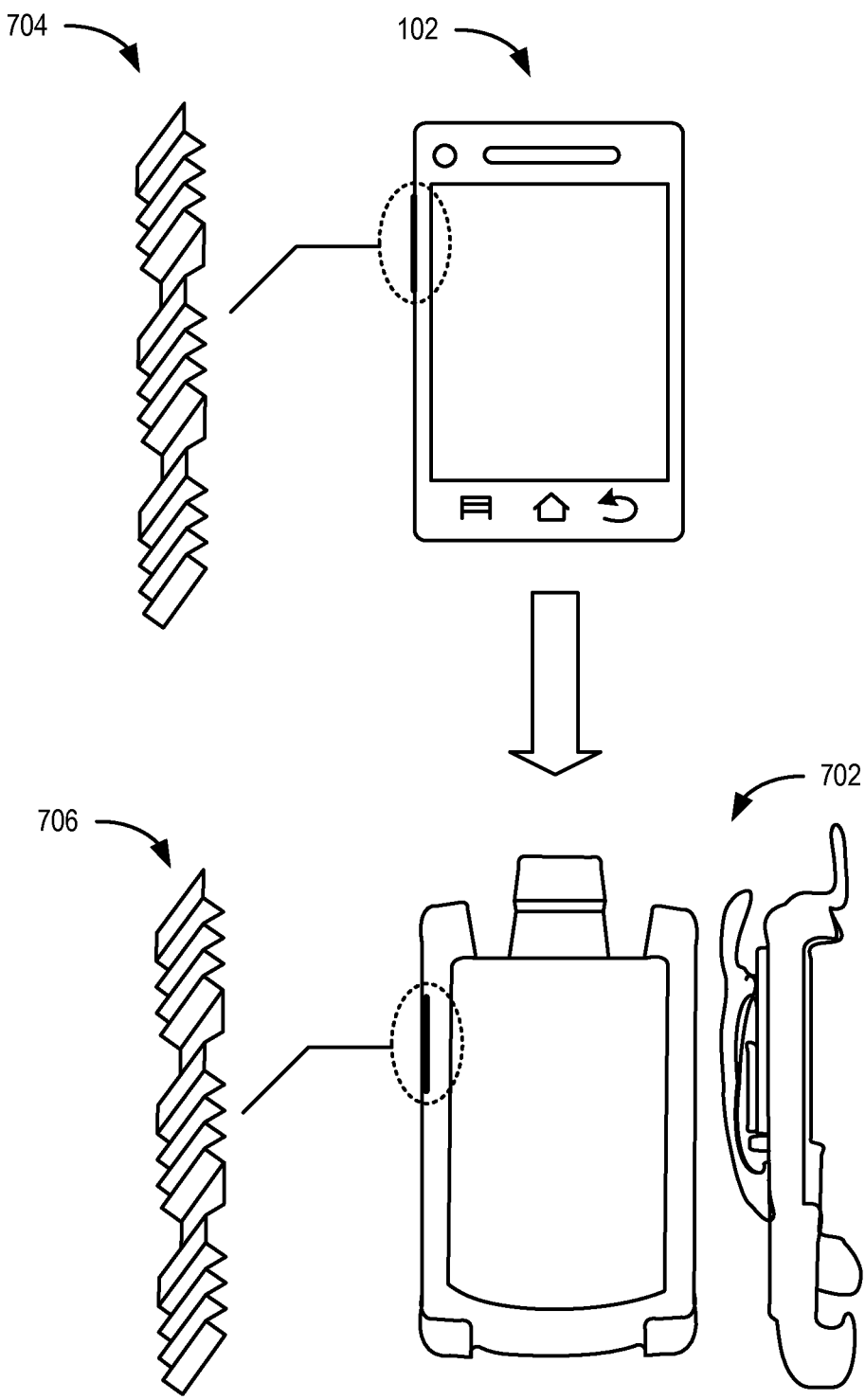
FIG. 7, which illustrates the use of acceleration signatures between a mobile device and an accessory.

As another application of using acceleration signatures, the concepts disclosed herein may be applied to accessories used in conjunction with mobile devices. Reference is made to FIG. 7, which illustrates the use of acceleration signatures between a mobile device 102 and an accessory 702. Existing mobile devices are made to interoperate with a large variety of accessories. Often, there is a need for the accessory to identify itself with the mobile device, or vice versa—for the mobile device to identify itself to the accessory. Once identified, the mobile device or accessory can configure itself for best operation with each other. The exterior of a mobile device or accessory may be designed to have unique bumps, ridges, or grooves. When a unique ridge pattern on one device moves across another unique groove pattern on another device, this creates a unique vibration pattern.

With reference to FIG. 7, the mobile device 102, the accessory 702, or both devices 102, 702 may include corresponding ridged members 704, 706 and maybe equipped with an accelerometer (not shown) for providing vibration pattern recognition capability, as described earlier. The mobile device 102 and\or accessory 702 may be designed to have structural bumps\grooves that are preferably unique to that device. In operation, the mobile device 102 is attached to or placed in the accessory 702, and a unique vibration pattern is created. The vibration pattern is then analyzed by the accelerometer. If the accelerometer in the mobile device 102 or accessory 702 recognizes the unique vibration pattern (via lookup or via some other mechanism), the device configures itself as needed to interoperate with the other device. In this regard, acceleration events may be initiated by a user of the mobile device 102 or initiated by an apparatus coming in contact with the mobile device 102. The accessory 702 may comprise, for example, a holster, a cradle, or a mounting apparatus for the mobile device 102.

Figure 8:
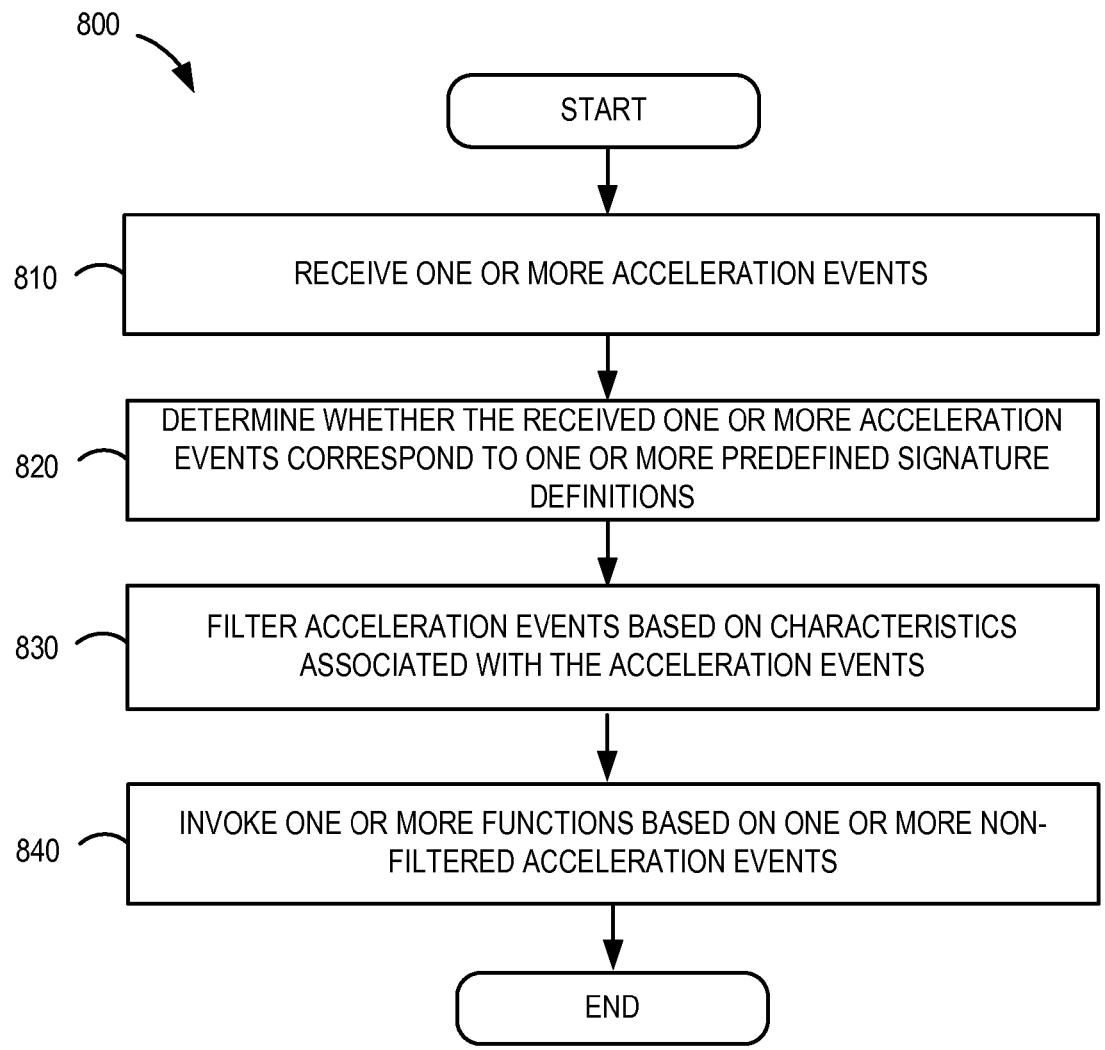
FIG. 8 is a flowchart in accordance with an embodiment for utilizing acceleration signatures implemented in the mobile device shown in FIG. 2.

FIG. 8 is a flowchart in accordance with an embodiment for utilizing acceleration signatures implemented in the mobile device 102 shown in FIG. 2. If embodied in software, various blocks depicted in FIG. 8 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart 800 in FIG. 8 shows a specific order of execution, it is understood that the order of execution may differ from that which is depicted. In accordance with some embodiments, a method is implemented in the mobile device 102 (FIG. 2) for utilizing acceleration event signatures to invoke functions on the mobile device 102. In block 810, one or more acceleration events are received. In block 820, a determination is made on whether the received one or more acceleration events correspond to one or more predefined signature definitions. In block 830, acceleration events are filtered based on characteristics associated with the acceleration events. In block 840, one or more functions are invoked based on one or more non-filtered acceleration events. For some embodiments, invoking one or more functions based on the remaining acceleration events comprises determining one or more areas on the electronic device in which the non-filtered acceleration events were received. Based on both the determined one or more areas and characteristics of the acceleration events, a function is invoked. Characteristics of the acceleration events may comprise one or more of: frequency of the acceleration events and a number of same acceleration events.

For some embodiments, the method may further comprise filtering acceleration events based on characteristics associated with the acceleration events, wherein filtering acceleration events comprises comparing an elapsed time between successive acceleration events with a predetermined threshold. Filtering acceleration events may also comprise determining whether a predetermined number of acceleration events is received within a predetermined amount of time. Filtering acceleration events may also comprise filtering acceleration events with frequencies outside a target frequency band. The method may further comprise filtering acceleration events that do not match a predefined signature definition stored on the electronic device.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for utilizing acceleration event signatures in an electronic device, comprising:
   receiving, by the electronic device, one or more acceleration events;
   filtering acceleration events based on characteristics associated with the acceleration events, wherein filtering acceleration events comprises comparing an elapsed time between successive acceleration events with a predetermined threshold;
   determining whether the received one or more acceleration events correspond to one or more predefined signature definitions, with the predefined signature definitions corresponding to vibrations generated by swiping a first ridged member arranged along an exterior of the electronic device; and
   invoking one or more functions based on the one or more acceleration events.

2. The method of claim 1, wherein filtering acceleration events comprises determining whether a predetermined number of acceleration events is received within a predetermined amount of time.

3. The method of claim 1, wherein filtering acceleration events comprises filtering acceleration events with frequencies outside a target frequency band.

4. The method of claim 1, further comprising filtering acceleration events that do not match a predefined signature definition stored on the electronic device.

5. The method of claim 1, wherein invoking one or more functions based on the remaining acceleration events comprises:
   determining one or more areas on the electronic device in which the non-filtered acceleration events were received;
   based on both the determined one or more areas and characteristics of the acceleration events, invoking a function.

6. The method of claim 5, wherein characteristics of the acceleration events comprise one or more of: frequency of the acceleration events and a number of same acceleration events.

7. The method of claim 5, wherein the function comprises a wake-up function for the electronic device.

8. The method of claim 5, wherein the function comprises a volume control function for the electronic device.

9. The method of claim 1, wherein the one or more acceleration events are initiated by a user of the electronic device.

10. The method of claim 1, wherein the one or more acceleration events are initiated by an apparatus coming in contact with the electronic device, wherein the apparatus comprises one of: a holster, a cradle, and a mounting apparatus for the electronic device.

11. The method of claim 1, wherein the predefined signature definitions are based on the vibrations generated by the swiping of the first ridged member in two different directions, the invoking comprising invoking a single one of the functions based on the two acceleration events corresponding to the two swipes.

12. The method of claim 1, wherein the first ridged member is partitioned according to various lengths, wherein vibrations associated with the swipe across a first length is used to determine a first characteristic of the swipe, vibrations associated with the swipe across a second length is used to determine a second characteristic of the swipe, and vibrations associated with the swipe across a third length is used to monitor for a second instance of the swipe pattern across the first and second lengths.

13. An electronic device for utilizing acceleration event signatures, comprising:
   an accelerometer configured to receive acceleration events;
   a filter configured to filter the acceleration events based on characteristics associated with the acceleration events;
   a first ridged member arranged along an exterior of the electronic device to generate vibrations responsive to being swiped bi-directionally within a predetermined window of time;

a signature correlator configured to determine whether the received acceleration events correspond to a predefined acceleration event signature, wherein the predefined acceleration event signature corresponds to the first ridged member being swiped bi-directionally within a predetermined window of time;

a memory configured to store one or more predefined signature definitions corresponding to the predefined acceleration event signature and other predefined acceleration event signatures; and a function controller configured to invoke a function based on the determination that the received acceleration events correspond to the predefined acceleration event signature, wherein one of the one or more predefined signature definitions corresponding to the predefined acceleration event signature is based on the vibrations generated by the swiping of the first ridged member bi-directionally within the predetermined window of time, the function controller configured to invoke the function based on a combination of the acceleration events corresponding to the swipe in a first direction of the bi-directional swipe and a second acceleration event corresponding to the swipe in the other direction of the bi-directional swipe.

14. The device of claim 13, wherein the function controller is configured to invoke a function if the received acceleration event is not filtered by the filter and the signature correlator.

15. The device of claim 13, further comprising a clock configured to provide a timing reference for measuring frequency of received acceleration events.

16. The device of claim 13, wherein the filter is configured to filter the acceleration event if the acceleration event does not fall within a target frequency band.

17. The device of claim 13, wherein the function invoked is further based on a location of the ridged member on the electronic device.

18. The device of claim 13, further comprising:
a second ridged member; and
a second accelerometer, wherein the function invoked is further based on a location of the ridged members on the electronic device, wherein the second ridged member is coupled to the second accelerometer.

19. The device of claim 13, wherein the filter is configured to disregard a combination of acceleration events if the combination does not occur within the window of time.

20. An electronic device for utilizing acceleration event signatures, comprising:
an accelerometer configured to receive acceleration events;
a filter configured to filter the acceleration events based on characteristics associated with the acceleration events;
a ridged member arranged along an exterior of the electronic device, the ridged member partitioned serially along a length of the ridged member according to plural different patterns of ridges;
a signature correlator configured to associate each pattern with a corresponding predefined acceleration event signature, wherein each predefined acceleration event signature corresponds to each partitioned portion of the ridged member being swiped; and
a function controller configured to invoke a respective function for each predefined acceleration event signature based on at least single swipe across the entire ridged member.

* * * * *